United States Patent
Bedeker

[19]

[11] Patent Number: 5,911,337
[45] Date of Patent: Jun. 15, 1999

[54] VESSEL FOR A SHIPPING CONTAINER

[76] Inventor: James E. Bedeker, 2981 N. Route 71, Ottawa, Ill. 61350

[21] Appl. No.: 08/838,507

[22] Filed: Apr. 8, 1997

Related U.S. Application Data

[63] Continuation-in-part of application No. 08/539,192, Oct. 4, 1995, abandoned.

[51] Int. Cl.$^6$ .............................. B60P 3/22; B65D 25/38
[52] U.S. Cl. .................... 220/562; 230/592.25; 230/608; 230/DIG. 24
[58] Field of Search ............................... 220/1.5, 592.25, 220/608, 4.14, DIG. 24, 562; 414/498, 812; 222/185.1

[56] References Cited

U.S. PATENT DOCUMENTS

| | | | |
|---|---|---|---|
| 3,058,753 | 10/1962 | Carlsen | 220/562 |
| 3,328,496 | 6/1967 | Graves | 220/592.25 |
| 3,726,431 | 4/1973 | Botkin | 220/1.5 |
| 3,814,290 | 6/1974 | Gerhard | 220/1.5 X |
| 3,971,491 | 7/1976 | Mowatt-Larssen et al. | 220/1.5 X |
| 4,065,022 | 12/1977 | Cainaud | 220/1.5 |
| 4,412,626 | 11/1983 | Gerhard | 220/1.5 |
| 4,421,243 | 12/1983 | Taquoi | 220/1.5 |
| 4,441,678 | 4/1984 | Dorpmund | 220/1.5 X |
| 4,445,624 | 5/1984 | Gill | 220/1.5 X |
| 4,591,064 | 5/1986 | Gerhard | 220/1.5 |
| 4,819,830 | 4/1989 | Schultz | 220/371 |
| 5,183,371 | 2/1993 | O'Daniel | 44/498 X |
| 5,390,806 | 2/1995 | Elston et al. | 220/1.5 |
| 5,538,286 | 7/1996 | Hoff | 220/562 |
| 5,603,359 | 2/1997 | Geiser | 222/185.1 |
| 5,819,970 | 10/1998 | Solimar | 220/562 |

*Primary Examiner*—Stephen Castellano
*Assistant Examiner*—Niki M. Eloshway
*Attorney, Agent, or Firm*—Haynes and Boone, LLP

[57] ABSTRACT

An enclosed vessel assembly for transporting and storing unpackaged materials is disclosed. An aluminum vessel is inserted into an openable end of a conventional steel shipping container, and secured therein such that unpackaged goods may be efficiently and inexpensively transported and stored using such containers. The aluminum vessel includes a rigid, elongated, closed-ended, cylindrical aluminum body having a rear end which is accessible through the openable end of the shipping container. Disposed on the rear end of the body of the vessel are a fill pipe through which unpackaged materials may be loaded into the vessel assembly, a conical discharge assembly for enabling a pneumatic tank trailer to be connected thereto to extract unpackaged materials from the vessel assembly, and at least one vent for facilitating the extraction of goods through the discharge assembly using a pneumatic tank trailer.

18 Claims, 5 Drawing Sheets

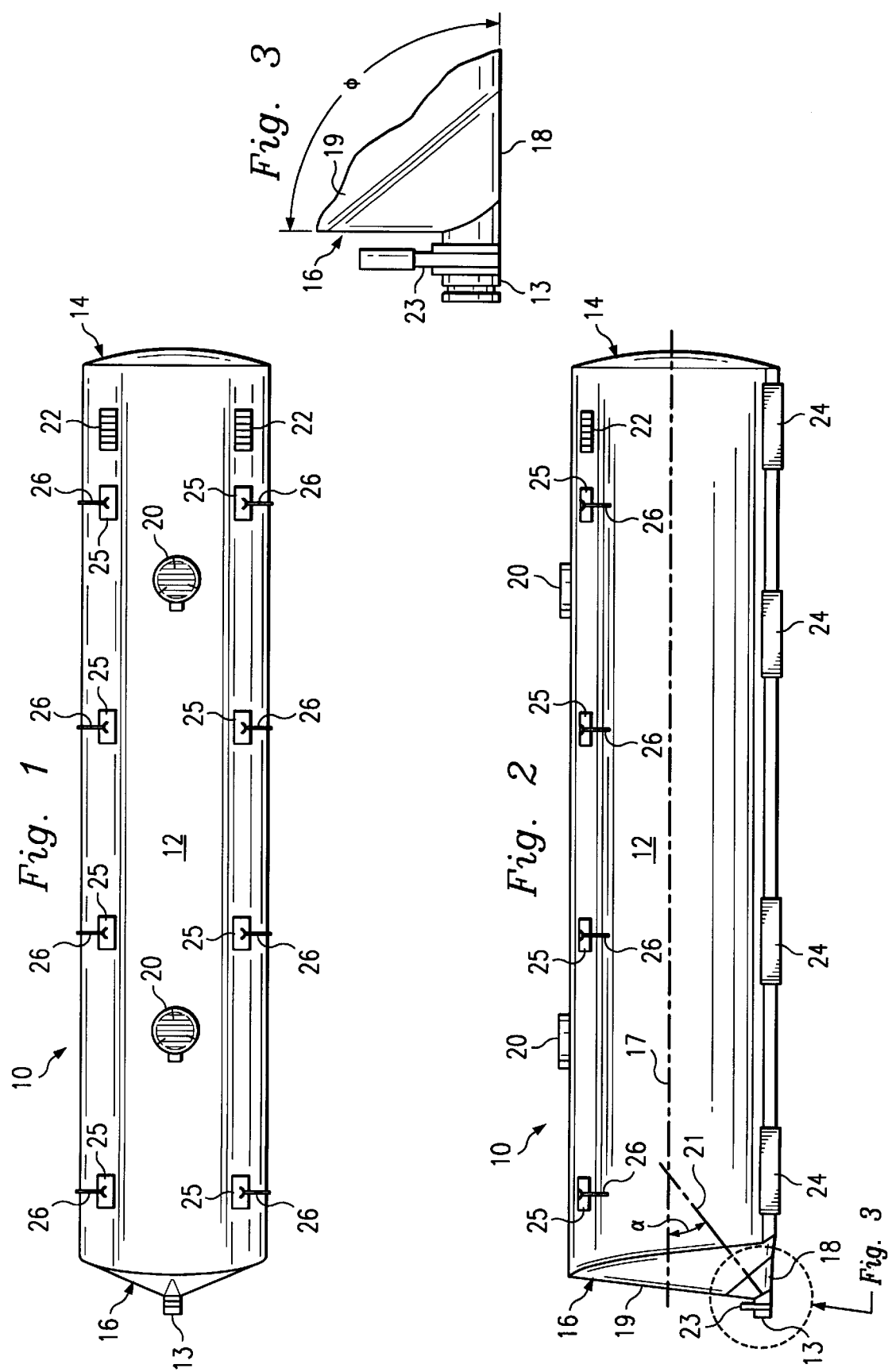

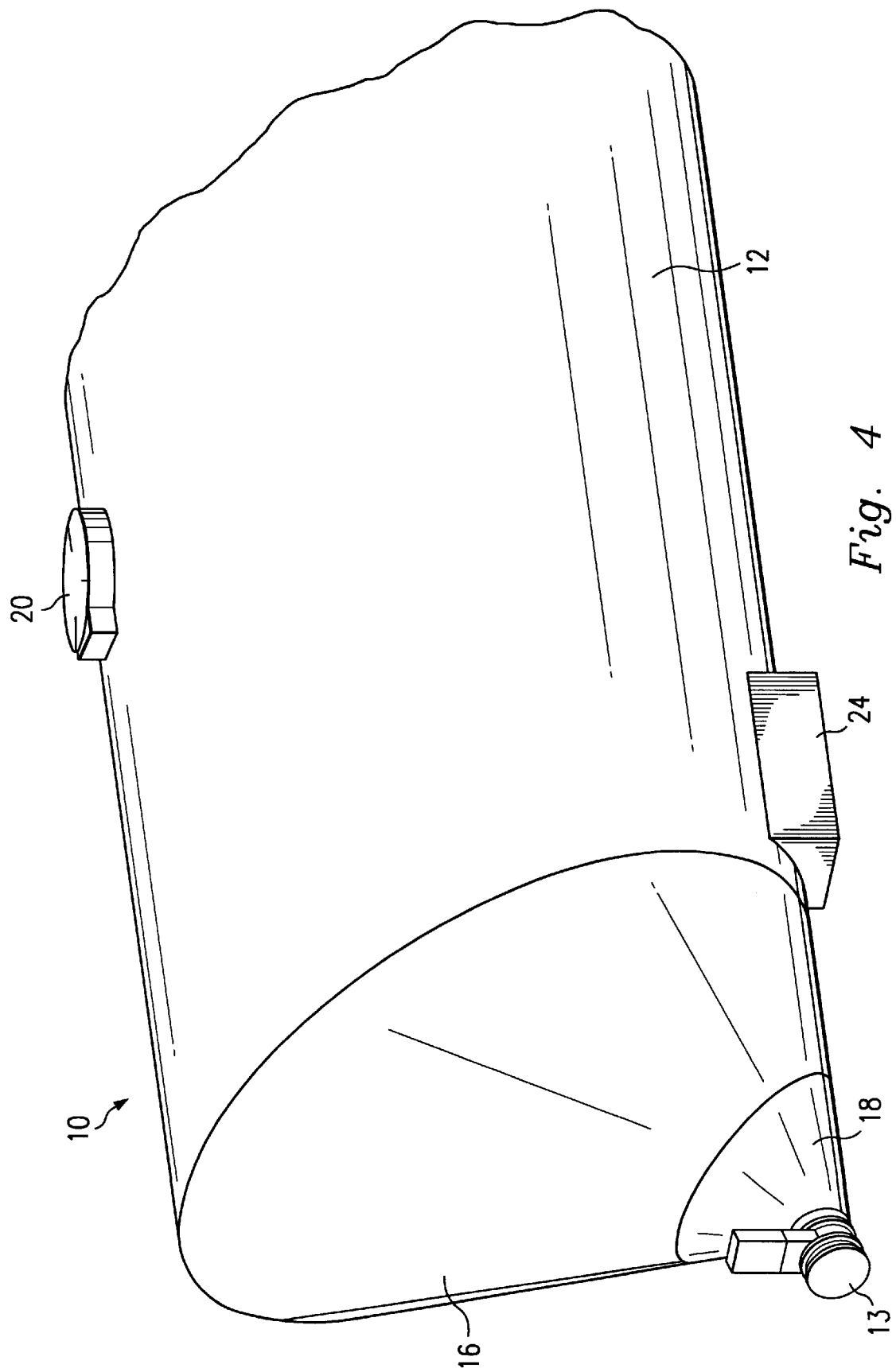

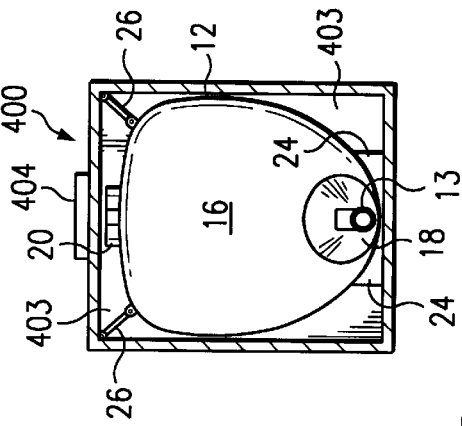
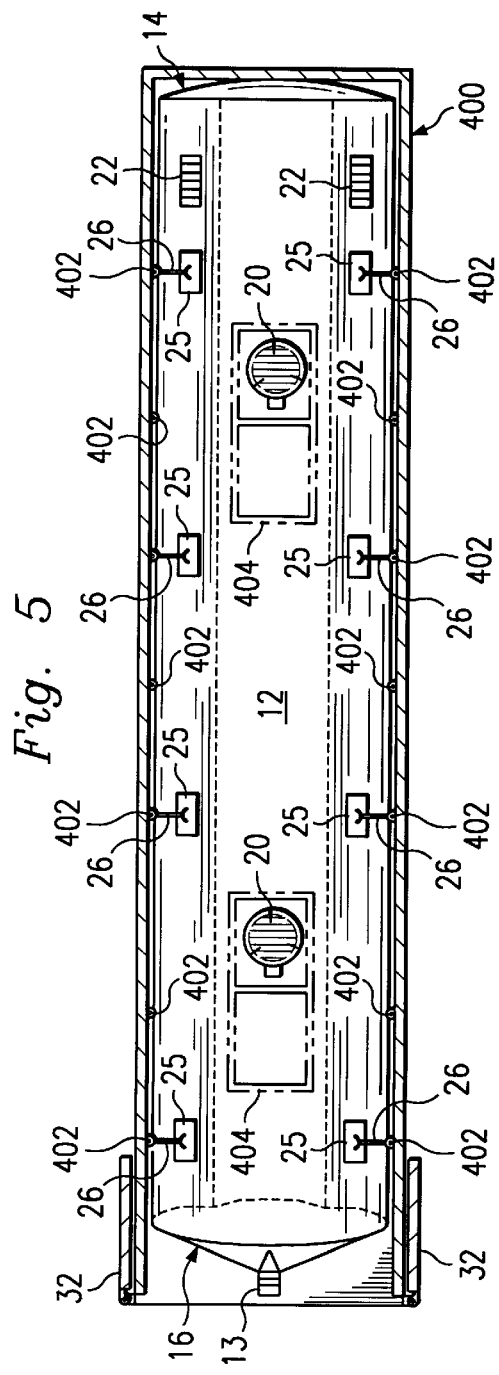
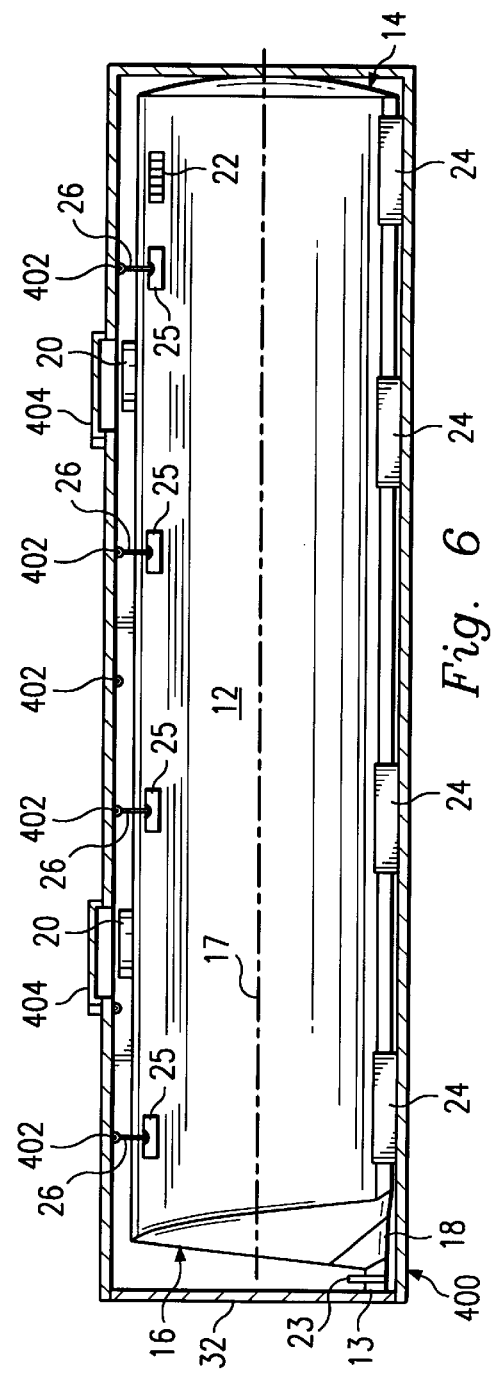

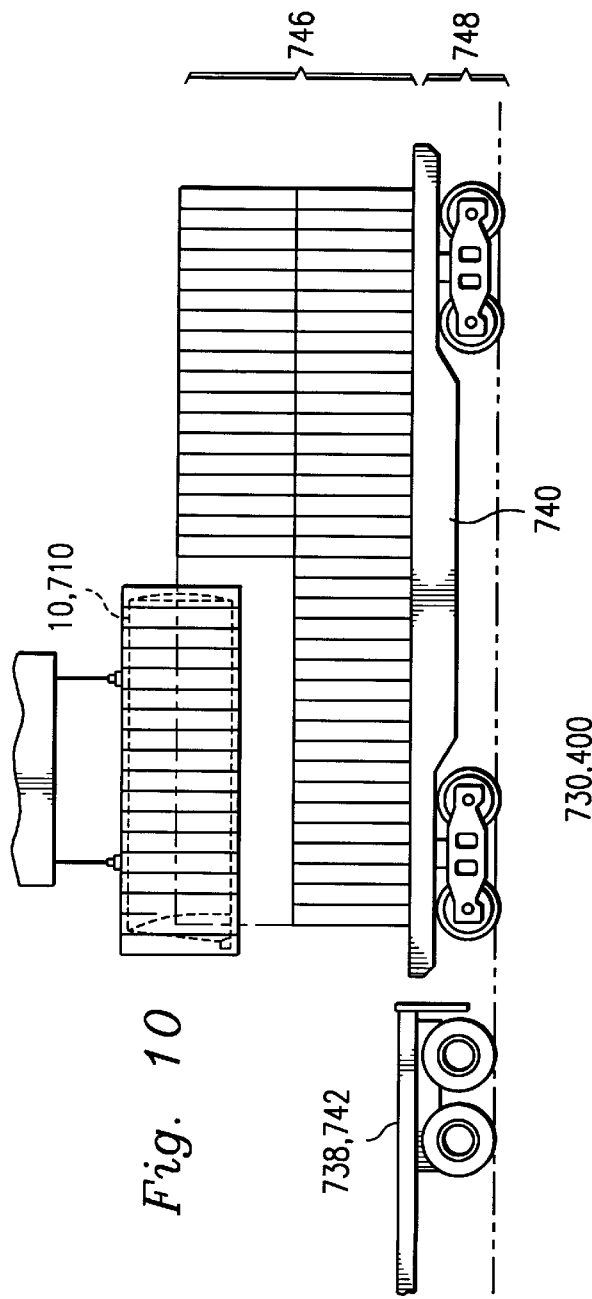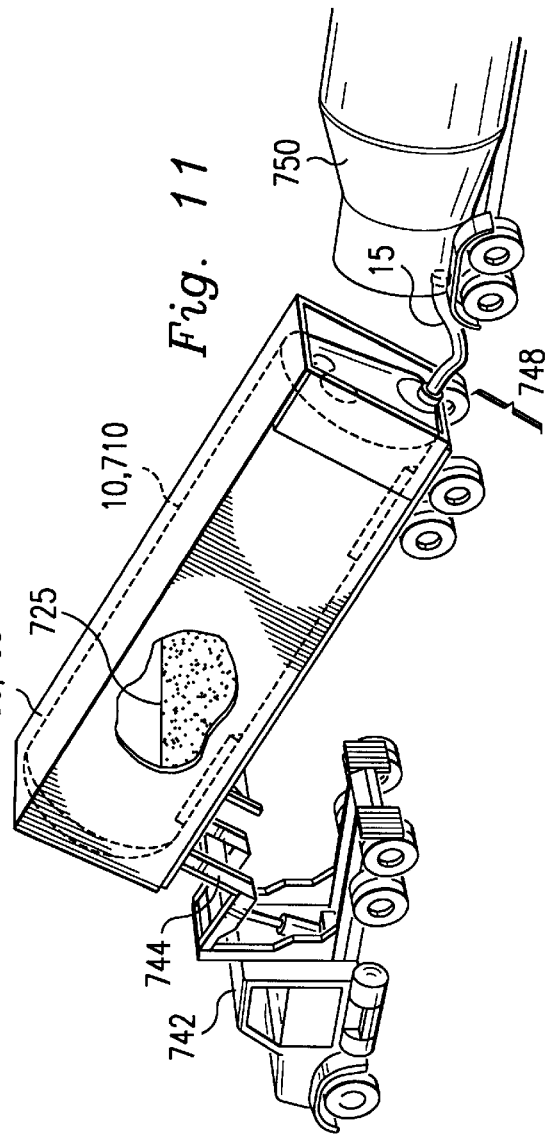

VESSEL FOR A SHIPPING CONTAINER

CROSS-REFERENCE TO RELATED APPLICATION

This application is a continuation-in-part of patent application Ser. No. 08/539,192, entitled "Liner Assembly for Shipping Container", filed Oct. 4, 1995 now abandoned.

TECHNICAL FIELD

The invention relates generally to the transportation of unpackaged materials such as dry bulk or dry flowable materials and, more particularly, to a vessel for enabling unpackaged materials to be transported and stored using conventional steel shipping containers.

BACKGROUND OF THE INVENTION

There are several prior art methods of transporting unpackaged materials, such as plastic pellets, flour, and sugar, from the manufacturer or producer to the end user. Probably the most popular method is to use hopper railcars, each capable of carrying up to four standard truckloads of material and having a phenolic plastic lining to prevent contamination of the material. The material is shipped via rail to a transfer or "bulk distribution" yard at a desired destination. Here, the hopper railcars are pulled off the main line onto a spur and lined up. In this manner, hopper railcars may be used not only for transportation, but also for storage. When the manufacturer or producer sells a load of product, a common carrier uses a vacuum pneumatic tank trailer to extract a load of product out of the hopper railcar and then transports it to the end user, where it is typically blown into a silo or other appropriate structure for storage.

Although the hopper railcar transportation/distribution method described above has worked well over the years, it suffers certain recognized deficiencies. First, it is relatively expensive, due to the fact that, because the railcars are used for both transportation and storage, the manufacturer must purchase several hopper railcars, pay the freight required to transport each hopper railcar, and then pay a daily fee for each hopper railcar to remain parked on a rail at a remote distribution yard until the goods in the hopper railcar have been sold. In addition, because the hopper railcar has a capacity which is four times that of a standard truckload, only very high quantities of unpackaged materials, to be delivered to a common destination, may be transported by this method. Moreover, it can take several weeks to move a hopper railcar across the country. Therefore, because such hopper railcars are used for both transportation and storage, a manufacturer/producer must have more hopper railcars at its disposal than would be the case if the hopper railcars were transported more quickly.

One alternative to using hopper railcars to transport and store unpackaged materials is to load the material into tank trailers that have been converted into "lift on/lift off" vehicles, which may be transported via flatbed railcar to the designated destination, lifted off the flatbed, hooked on to a truck and delivered to the end user. Such tank trailers are typically transported on dedicated trains; as a result, trailers may be transported from coast to coast in as little as thirty-six (36) hours and, in any event, much less time than it takes to transport a hopper railcar. However, although this method of transportation and distribution enables materials to be transported, stored, and distributed in their original container (i.e., the tank trailer), the investment required in tank trailers is significantly higher than the equivalent capacity in hopper railcars when one considers that it takes four such tank trailers to transport the same amount of material as one hopper railcar. Hence, this method, although rapid, is not particularly cost effective.

Another alternative has been to use a pneumatic container comprising a pressurized vehicle that unloads like a pneumatic trailer. Similar to the tank trailers, such pneumatic containers can be shipped by rail on flatbed cars or by seagoing vessel. To unload the container, a tipping chassis, such as a "BARTLET"-type lift, is used to tip the container so that when the material contained therein is pressurized, the product falls out. However, while pneumatic containers offer advantages similar to those of tank trailers, as described above, they also suffer the same deficiencies; that is, the investment required in tank trailers is significantly higher than the equivalent capacity in hopper railcars. Again, four such trailers are required to carry the same amount of material as a single hopper railcar.

A final alternative has been to use conventional steel shipping containers that are designed to transport packaged products via rail and on seagoing vessels. An advantage of such containers is that they are readily available at a low cost. In addition, because they are certified under federal regulations for transport by rail, they may be adapted for specialized use without first undergoing additional expensive certification procedures. Another advantage is that they may be stacked one on top of another when transported via a railcar. When stored, these containers may be stacked nine high, thus substantially decreasing storage cost. However, because such containers are typically designed to transport packaged, rather than unpackaged materials, it is necessary that they be lined in some fashion to prevent contamination of the unpackaged materials.

One popular method of lining conventional steel shipping containers is to insert a phenolic plastic liner, such as those available from Insta-Bulk, Inc., Houston, Tex., into the containers before filling the containers with the materials to be transported. Although this alternative has become a popular method of shipping unpackaged materials overseas, it is deficient in that such plastic liners do rip, thereby contaminating the unpackaged materials contained therein.

For example, if a worker nails a nail to the floor of the container in order to strap a package into place, and later fails to remove the nail, the nail is likely to puncture the plastic liner once the liner is filled with unpackaged materials (the weight of the unpackaged materials exerts substantial pressure against the nail). In addition, if a worker gouges the floor causing the wood which lines the floor to splinter, the splinter may puncture the plastic liner. Furthermore, in cases where residual unpackaged material, such as a bean, remains in the container when the liner is installed, the residual unpackaged material may cause the plastic liner to rupture.

A still further drawback of the plastic-lined container shipping method is that the liners are not reusable and, once used, must be disposed of in some manner. In some countries, such as Germany, environmental laws forbid the disposal of these liners within their territories. This causes additional inconvenience in that the used liner must then be shipped out of the country for disposal.

A still further drawback is that the plastic liner must be built into the container, a labor-intensive process which involves fabricating a head, a special frame which supports the liner. Because of container defects and the variation in the size of the container, the frame is usually custom fabricated from wood. The weight of the unpackaged materials, 40,000 pounds when fully loaded, creates sufficient stress to break a weak frame, thereby causing significant waste.

In addition, the standard shipping container is designed to carry packaged goods, goods which themselves contain the goods to be transported. The container is not designed to handle a uniform pressure against all the walls of the container such as that which unpackaged goods impose. Rather, it is designed to protect packed materials from the elements, from spillage, and, to a limited extent, from theft.

Further, because the plastic liner is not rigid, and includes only a non-structural plastic sleeve through which product may be loaded and unloaded, special handling is required to mate the sleeve with the loading and unloading device being used. Because of this handling difficulty, the liner cannot be unloaded using a vacuum pneumatic tank truck. Rather, the liner must be unloaded into a secondary container called an air lock. The air lock includes a conveyor system which then transports the unpackaged materials to a storage location, or to a truck.

Further, the plastic-lined shipping container can only be insulated on the exterior surface of the container. This changes the shape of the container, adversely affecting the modularity and stackability of the container.

Therefore, what is needed is an apparatus for enabling unpackaged materials to be shipped in a more timely, economic, and convenient manner than heretofore possible.

SUMMARY OF THE INVENTION

The present invention, accordingly, provides an apparatus for transporting and storing unpackaged materials that overcomes or reduces limitations associated with prior transportation and storage methods and apparatuses. In a departure from the art, a specially designed aluminum vessel of the present invention is inserted into and secured within a conventional steel shipping container, such that unpackaged materials may be efficiently and inexpensively transported and stored using such containers.

In one embodiment, the aluminum vessel comprises a rigid, elongated aluminum body having closed ends and a substantially egg-shaped cross-section. The front, or "head," end of the assembly is dish-shaped to prevent buckling and flexing therein, and the rear end of the assembly comprises a conical discharge assembly for enabling a pneumatic tank trailer to be connected thereto to extract unpackaged materials from the vessel.

The vessel is supported in an upright position within the container by at least one support angle member disposed on each side of the bottom of the body and is secured to the floor of the container by bolts extending through the support angle members and the floor of the container. The vessel is further supported in an upright position within the container by turnbuckles disposed along each side of the top of the vessel and secured to hooks provided on the top interior of the container.

Two hinged, rectangular openings, or hatches, are provided through the top of the container for respectively providing access to two manhole assemblies disposed in the top of an enclosed vessel assembly through which unpackaged materials may be loaded into the vessel assembly. At least one vent is also provided in the top of the vessel for facilitating the extraction of goods through the discharge assembly using a pneumatic tank trailer.

In a second embodiment, the aluminum vessel comprises an elongated cylindrical aluminum body having closed ends. The front, or "head," end of the assembly is dish-shaped to prevent buckling and flexing therein, and the rear end of the assembly comprises a conical discharge assembly for enabling a pneumatic tank trailer to be connected thereto to extract unpackaged materials from the vessel.

The vessel is supported within the container by at least one support angle member which is welded on each side of the bottom of the body and secured to the floor of the container by bolts. A fill pipe is disposed in an upper portion of the rear closed end of the vessel through which unpackaged materials may be loaded into the vessel assembly. A vented hatch assembly is also provided in the upper portion of the rear end of the vessel for facilitating the loading of goods through the fill pipe and the extraction of goods through the discharge assembly using a pneumatic tank trailer.

A technical advantage achieved with the invention is that it enables unpackaged materials to be shipped more quickly and inexpensively than hopper railcars, for the following reasons: (1) four vessel assemblies are less expensive than a single hopper railcar; (2) the size and cost of the vessel assembly justifies shipping less unpackaged materials to a greater number of potential customers; (3) the modular design of the vessel assembly permits less costly storage of unpackaged materials because the vessel assembly can be shipped in a stacked fashion on flatbed cars via dedicated trains, and the storage portion, including the body and the shipping container, is removable from the chassis portion or transportation means; and (4) the vessel assembly allows delivery of the same amount of unpackaged materials at four different times, thus permitting a just-in-time delivery of unpackaged materials and substantially increasing the number of inventory turns per year, as compared with hopper cars.

Another technical advantage is achieved, as compared to hopper cars, in that the vessel assembly may be shipped on seagoing vessels.

Another technical advantage achieved with the invention is that the vessel provides a low-cost modification to a conventional shipping container that does not require additional certification procedures in order to comply with federal rail transportation regulations.

A further technical advantage achieved with the invention is that it achieves the convenience of plastic liners without potentially contaminating the goods. The unpackaged materials can be loaded at the manufacturer or producer, sealed, shipped, stored, delivered to the end user and unloaded in a completely enclosed environment, thus controlling inventory and preventing contamination of the unpackaged materials.

Yet another technical advantage achieved with the invention is that, unlike a plastic liner, it is washable and reusable.

BRIEF DESCRIPTION OF THE DRAWINGS

FIG. 1 is a top plan view of an aluminum vessel of the present invention.

FIG. 2 is a side view of the aluminum vessel of FIG. 1.

FIG. 3 is a close up side view of the aluminum vessel of FIG. 2, in the region designated by numeral 3.

FIG. 4 is a rear end view of the aluminum vessel of FIG. 1.

FIG. 5 is a top view of the aluminum vessel of FIG. 1 disposed within a conventional steel shipping container.

FIG. 6 is a side view of the aluminum vessel assembly of FIG. 5.

FIG. 7 is a rear end view of the aluminum vessel assembly of FIG. 5.

FIG. 10 is a side view of the vessel assembly of FIG. 8 being stacked onto a railcar.

FIG. 11 is a partial cut-away, perspective view of the vessel assembly of FIG. 8 being unloaded into a vacuum pneumatic trailer truck.

DESCRIPTION OF THE EMBODIMENTS

Figure 8:
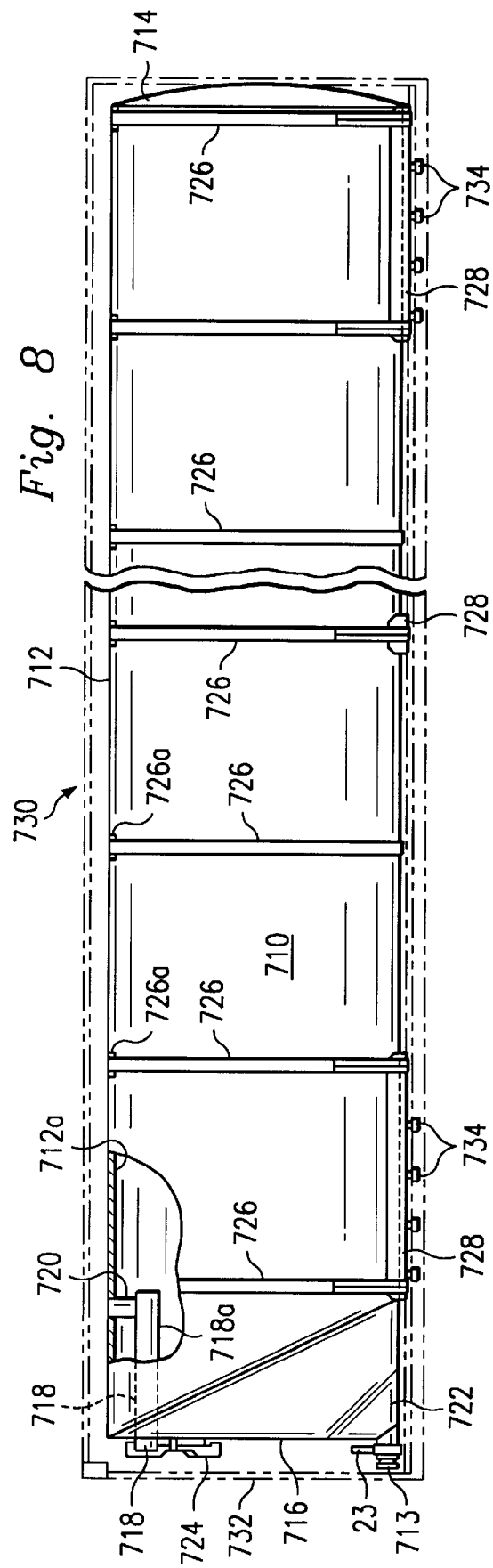
FIG. 8 is a partial cut-away, side view of an aluminum vessel assembly, according to a second embodiment of the present invention.

FIGS. 1 and 2, respectively, depict top and side views of an aluminum vessel 10 embodying features of the present invention. As shown in FIGS. 1 and 2, the vessel 10 comprises a rigid, elongated aluminum body 12 having dish-shaped front and rear closed ends, respectively designated by reference numerals 14 and 16. An imaginary line 17 extends along the length of the body 12 between the front and rear closed ends 14 and 16. In this embodiment, the vessel 10 is constructed of a combination of 0.156- and 0.125-inch thick aluminum having an interior which is ground to a food-grade surface finish to facilitate cleaning. As shown in FIG. 4, the cross-section of the body 12 is substantially egg-shaped, with the wider end forming the top of the body 12 and the narrower end forming the bottom of the body 12, in order to facilitate the extraction of unpackaged materials that may be stored in the body 12 through a conical discharge assembly 18. The conical discharge assembly 18 (see also FIG. 3) connects to the apex of a cone 19 which makes up the rear end 16 of the body 12. The cone 19 has an included angle Ø (shown in FIG. 3) of approximately 90°. The discharge assembly 18 includes a discharge fitting 13 and a valve 23 (shown in FIG. 3). A discharge line 15 (shown in FIG. 11) may be sealingly connected to the discharge fitting 13. The valve 23 controls the flow of unpackaged materials through the discharge line 15. The centerline 21 of the cone 19 is neither collinear with, nor parallel to, the line 17 of the body 12. Rather, the centerline 21 of the cone 19 is angled at an angle , slightly greater than 45°, with respect to the line 17 of the body 12 such that the discharge assembly 18 is advantageously located at the lower-most portion of the rear end 16 of the body 12 in order to facilitate unloading.

Two manholes 20, which are preferably aluminum non-pressure manhole assemblies, commercially available from Knappco Corporation of Kansas City, Mo., are provided on the top of the body 12, in a longitudinally-spaced relationship to one another, for enabling unpackaged materials to be loaded into the vessel 10. Location of the manholes 20 on top of the body 12 is advantageous when loading fragile unpackaged materials such as coffee beans which easily fracture or crumble when pneumatically injected into the body 12. Vents 22 are also provided in the top of the body 12 to facilitate the unloading of the unpackaged materials using a pneumatic tank truck (not shown) connected to the discharge assembly 18.

As will be described in further detail below, a plurality of frame or support angle members 24 are provided along the bottom sides of the body 12 for supporting the body 12 in an upright position when the vessel 10 is inserted in a steel shipping container 400 or 730 (shown in FIGS. 5–11). The shipping container 400 or 730 varies in length (usually having a total length of either twenty or forty feet), but has a more or less square cross section having sides of between 90 and 120 inches in length. Similarly, a plurality of turnbuckle support members 25 are disposed along the top sides of the body 12. Turnbuckles 26 connect from the turnbuckle support members 25 to hooks 402 disposed along the top interior of the steel shipping container (FIGS. 5–6), thus securing the vessel 10 in place. As used herein, and as generally recognized, a turnbuckle refers to a device having a body portion with two ends into which screw eyes install. At each end, female screw threads of opposite sense receive corresponding threaded screw eyes, such that a first device to which the turnbuckle is secured may be removably connected and drawn to a second device by placing a screw eye through a hook in each of the devices and by rotating the body portion with respect to the hooks or screw eyes. Additionally, the screw eye may be connected to the screw thread via a swivel.

FIGS. 5, 6, and 7, respectively, illustrate top, side, and rear views of the vessel 10 disposed within a conventional steel shipping container 400. As indicated above, a plurality of hooks 402 are disposed along the top interior of the container 400 such that each of the turnbuckle members 26 may be connected to one of the hooks 402 for stabilizing the vessel 10 within the container 400. The vessel 10 is bolted to the floor of the container 400 through the support angle members 24. Preferably, three bolts are provided per member 24.

The rounded shape of the body 12 provides a crawlspace within the container 400 at a bottom portion thereof to facilitate securing the body to the container as just described. In addition, the rounded shape of the body 12 provides a dead-air space 403 which insulates the unpackaged materials from the effects of direct sunlight on the exterior surface of the shipping container 400, thereby permitting the transportation and storage of products having a relatively low melting point. When foam insulation (not shown) is blown in the dead-air space 403, still further insulating characteristics are realized. This is significant because some low-melt polymer pellets have a melting point of 130° Fahrenheit. This temperature is easily attained inside uninsulated containers which are subjected to direct sunlight for prolonged periods.

Hinged rectangular hatches 404 are provided in the top of the container 400 and are positioned over the manholes 20 of the vessel 10 such that the manholes 20 are accessible therethrough. The hatches 404 are shown in FIG. 5 in an open position and in FIG. 6 in a closed position. Doors 32, shown in an open position in FIG. 5 and in FIG. 6 in a closed position, are provided in the back of the container 400. The vessel 10 is positioned within the container 400 such that the discharge assembly 18 is accessible through the doors 32.

In accordance with a feature of the present invention, the vessel 10 may be cleaned using techniques and apparatuses commonly used to clean stainless tank trailers. Accordingly, unlike the plastic liners heretofore used to enable containers such as the container 400 to be utilized to transport unpackaged materials, the aluminum vessel 10 may be reused indefinitely. In addition, it is anticipated that the vessel 10 may be constructed of an appropriate durable, light and cleanable material other than aluminum. For example, steel, titanium, fiberglass, or heavy gage plastic, such as ABS plastic, may be used.

To unload unpackaged materials from the vessel assembly 36, the vessel 10 secured to the container 400, a pneumatic vacuum tank truck (not shown) may be connected to the discharge assembly 18 to vacuum unpackaged materials out.

To facilitate this process, the vessel assembly 36 may be tipped using a tipping chassis such as a "BARTLET"-type Lift 744 (shown in FIG. 11), such that the front end 14 is raised above the rear end 16, thereby causing the unpackaged materials to gravity flow toward the discharge assembly 18. The substantial egg, or heart, shape of the body 12 facilitates the flow of unpackaged materials out of the body 12 through the discharge assembly 18. In addition, the location of the discharge assembly 18 on the lower portion of the rear end 16 of the vessel 10 enables complete unloading of the vessel by tipping the vessel at an acute angle of about 45°.

Although the various features and principles of the invention have been described in relation to the illustrated shipping container, it will be appreciated by those skilled in the art that one or more features or principles of the invention may be used in other forms of transport and/or handling methods. It is understood that the present invention can take many forms and embodiments without departing from the spirit or the scope of the invention. For example, alternative mounting arrangements other than the turnbuckle/hook and support angle member/bolts may be used to secure the vessel 10 within the container 400. In addition, the body 12 may take alternative shapes to more fully utilize the interior of the container 400. Furthermore, unpackaged materials other than unpackaged materials, e.g., liquid materials or slurries, may be transported and stored using the container 400 modified to include the vessel 10 of the present invention.

Figure 9:
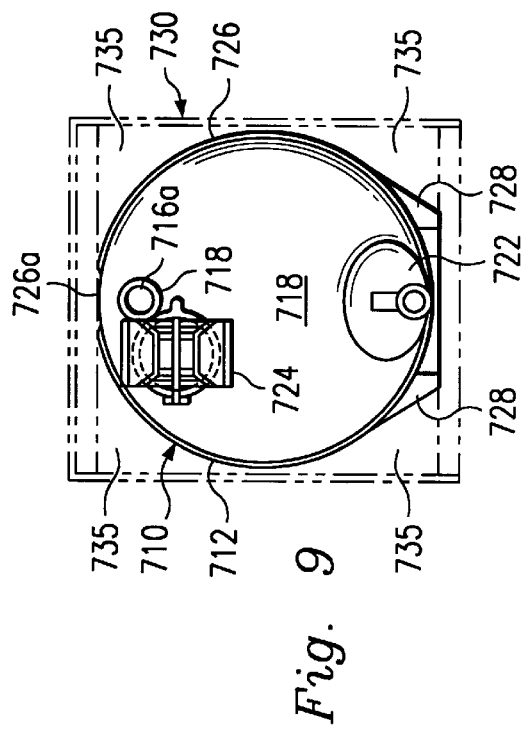
FIG. 9 is a rear end view of the aluminum vessel assembly of FIG. 8.

FIGS. 8 and 9 depict side and rear end views, respectively, of a second embodiment of an aluminum vessel 710. As shown therein, the vessel 710 comprises a rigid, elongated aluminum body 712 having dish-shaped front and rear ends, respectively designated by reference numerals 714 and 716. As shown in FIG. 9, the cross-section of the body 712 is substantially cylindrical rather than egg-shaped, as depicted in FIG. 4 of the previous embodiment. The cylindrical diameter of the body 712 is approximately 86.5 inches in order to fit within the shipping container 730, but different diameters may be used.

An opening 716a is formed in the upper portion of the rear end 716 of the body 712, and a fill pipe 718 is positioned in the opening for facilitating the loading of unpackaged materials into the vessel 710. The fill pipe 718 is formed from a six inch diameter pipe and includes an interior end 718a which extends approximately four feet into the body 712. The interior end 718a is supported within the body 712 by a support plate 720 secured between interior end 718a and an interior surface 712a of the body.

The lower portion of the rear end 716 also includes a conical discharge assembly 722 for facilitating the extraction of unpackaged materials that may be stored in the body 712. The discharge assembly 722 is similar to the discharge assembly 18, and, therefore, will not be described in greater detail. A vent 724 comprising, for example, a vented hatch cover vertically mounted on the upper portion of the rear end 716, facilitates the unloading of the unpackaged materials by permitting the connection of a pneumatic tank truck (not shown) to the discharge assembly 722. In addition, with a vertically mounted vent 724, it is not necessary to modify the standard shipping container 730 by providing hinged rectangular hatches 404, except where fragile unpackaged materials are to be handled. A suitable vented hatch cover is a twenty inch SALCO vented hatch assembly, available from Salco Products of LaMont, Ill.

A plurality of tension rings 726, spaced longitudinally along the body 712, circumscribe the body for supporting the cylindrical shape of the body. Except for a flat portion 726a that extends across the top of the body (as shown in FIGS. 8 and 9), the rings 726 define a U-shaped cross-section similar to that of a channel beam. The flat portion 726a is fabricated from a flat metal plate formed in an arch to conform with the surface of the body 712 and to enable the vessel 710 to pass through a rear end of a shipping container 730 (shown in phantom outline).

A plurality of support angle members 728 are provided along the bottom of the body 712 for supporting the body when the vessel 710 is inserted in the shipping container 730, thus forming an enclosed vessel assembly 736. The angle members 728 are welded to the tension rings 726 and define bolt holes (not shown) for bolting the vessel 710 to the floor of the shipping container 730. The support angle members have a width which provides a stable footing for the vessel 710 even when not secured to the shipping container 730. This permits stable storage of the vessel 710 outside of a shipping container 730, and generally safer handling during assembly of the vessel assembly 736.

The vessel 710 is configured for being inserted within a shipping container 730, which is similar to the shipping container 400 described above. The shipping container 730 includes a rear door 732 which opens up the rear end 716 sufficiently to permit the vessel 710 to be inserted therethrough and into the shipping container 730. The vessel 710 is secured within the shipping container 730 with bolts 734 that extend through the bolt holes defined in the angle members 728 into the floor of the shipping container 730. The rounded shape of the vessel 710 provides a dead-air space 735 between the vessel and the container 730. The dead-air space 735 insulates the unpackaged materials 725 from the effects of direct sunlight against the container, and may optionally be filled with insulation such as foam insulation, thereby permitting the transportation and storage of low melt plastics. When so disposed within the shipping container 730, and with the doors 732 opened, the vessel 710 may be loaded through the fill pipe 718, unloaded through the discharge assembly 722, and vented through the vent 724. It can be appreciated that, unlike the shipping container 400 described above, the shipping container 730 does not require the rectangular hatches 404 provided in the top of the container 400 for accessing the manholes 20 described in the preceding embodiment.

Referring now to FIGS. 10 and 11, a method of transporting and storing unpackaged materials 725 using the vessel assembly 36 or 736 includes the steps of: (1) loading unpackaged materials 725 into the vessel assembly 36 or 736; (2) installing and securing the vessel assembly 736 on a truck 738; (3) transporting the vessel assembly 736 to a railcar 740, which may include any one of the following types of railcars: an intermodal railcar, a flat car or flatbed railcar, a well car, a container car, bulkhead flat car, or a depressed-center flat car; (4) removing the vessel assembly 36 or 736 from the truck 738; (5) installing and securing the vessel assembly 736 to the railcar 740; (6) transporting the vessel assembly 736 to a location; (7) removing the vessel assembly 736 from the railcar 740; (8) installing and securing the vessel assembly 736 to a vehicle such as another truck 742, a barge (not shown), or a ship (not shown); (9) transporting the vessel assembly 736 to a second location; (10) removing the vessel assembly 736 from the truck 742, barge, or ship; and (11) storing the unpackaged materials 725 in the vessel assembly 36 or 736 at the second location. Optionally, when a truck 742 is used, the steps (10) and (11) above, of removing and storing, may be replaced by the steps of tilting the vessel assembly 736 using a tipping chassis such as the "BARTLET"-type lift 744; and (13) removing the unpackaged materials 725 as desired.

In an alternate method, the steps of loading, installing and securing, and transporting the vessel assembly 36 or 736 to a railcar, and installing and securing the vessel assembly to the railcar 740 are replaced by the steps of attaching and securing the vessel assembly to a railcar, and loading the unpackaged materials 725 into the vessel assembly.

In the methods above, a vacuum pneumatic tank trailer 750 may apply a vacuum to the body 12 of the vessel assembly 36 or 736 after the tilting step and before the removing step. This procedure draws the material 725 out of the body 12 with little or no pressure differential in the body because of the vent 20 or 724. Applying the vacuum significantly facilitates the unloading process.

Other aspects and features of the vessel 10 or 710, such as the cleaning and the unloading thereof, and the unpackaged materials carried therein, have been described above with respect to the preceding embodiment shown in FIGS. 1–6, and therefore will not be described in further detail herein with respect to the vessel 710 and the container 730.

A technical advantage achieved with the vessel assembly 36 or 736 is that it enables unpackaged materials 725 to be shipped more quickly and inexpensively than with hopper railcars, for the following reasons: (1) four vessel assemblies 36 or 736 are less expensive than a single hopper railcar (not shown); (2) the vessel assembly 36 or 736 can be shipped in a stacked fashion on flatbed railcars 740 via dedicated trains; (3) the size and cost of the vessel assembly 736 justifies shipping less unpackaged materials 725 to a greater number of potential customers; (4) the modular design of the vessel assembly 736 permits less costly storage of unpackaged materials 725 because the storage portion 746 of the vessel assembly is removable from the chassis portion 748, unlike the hopper car which remains attached to its undercarriage during storage; and (5) the vessel assembly 736 allows delivery of the same amount of unpackaged materials 725 at four different times, thus permitting a just-in-time delivery of such unpackaged materials and substantially increasing the number of inventory turns attainable per year, as compared with hopper cars.

Another technical advantage is achieved, as compared to hopper cars, in that the vessel assembly 736 may be shipped on seagoing vessels.

Another technical advantage is achieved, as compared to plastic-lined shipping containers, in that the unpackaged materials are independently contained and supported within the vessel 10 or 710, thereby eliminating the danger of contamination. The unpackaged materials 725 can be loaded at the manufacturer or producer, sealed, shipped, stored, delivered to the end user and unloaded in a completely enclosed environment, thus controlling inventory and preventing contamination of the unpackaged materials.

Another technical advantage is achieved, as compared to plastic-lined shipping containers, in that the vessel assembly 36 or 736 need not be disposed of after one use. Rather, after a simple cleaning, the vessel assembly 36 or 736 is ready for a return load of unpackaged materials 725.

Another technical advantage is achieved, as compared to plastic-lined shipping containers, in that the vessel assembly 36 or 736, once installed, need not be removed. Therefore, no set up or build-in time is required prior to use or reuse.

Another technical advantage is achieved, as compared to plastic-lined shipping containers, in that the discharge assembly 18 or 722 connects to the valve 23 which controls the flow of the unpackaged materials 725, thereby providing a predictable, repeatable, and sealable method of unloading the unpackaged materials 725.

Another technical advantage is achieved, as compared to plastic-lined shipping containers, in that the dead-air space 403 or 735 may be insulated, thus permitting the transportation and handling of a wider range of unpackaged materials 725, such as low-melt polymer pellets.

Another technical advantage is achieved in that the insulation may be injected into the dead-air space 403 or 735 within the container 400 or 730, thus having no effect on the container's stackability or modularity.

Another technical advantage is achieved by vertically mounting a combination vent/hatch cover 724 on the closed end 716 of the body 12 or 712 in that no modification is required to the exterior of the shipping container 730. This eliminates the need to install hinged rectangular hatches 404.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. An apparatus from storing unpackaged materials and comprising:

a rigid, horizontally-extending, elongated vessel having a horizontally extending longitudinal axis, a lower surface extending parallel to the longitudinal axis, a closed first end, a second end and an inlet opening for receiving the materials; and a substantially conical discharge member formed at said second end of the vessel, having a lower surface substantially aligned with the lower surface of the vessel, an apex, a discharge opening formed at said apex for discharging the materials, and a central axis, said central axis of the conical discharge member extends downwardly at an acute angle from the longitudinal axis of the vessel to the discharge opening to facilitate the discharge of the material from said discharge opening.

2. The apparatus of claim 1 further comprising a discharge pipe connected to the discharge member in registry with the discharge opening, the discharge pipe extending parallel to the lower surface of the vessel.

3. The apparatus of claim 1 wherein the inlet opening is formed through the discharge member above the discharge opening.

4. The apparatus of claim 1 wherein the discharge member is formed integrally with the vessel.

5. The apparatus of claim 1 further comprising a shipping container enclosing the vessel with the lower portion of the vessel extending on the floor of the container.

6. The apparatus of claim 5 further comprising at least one pair of support members extending to either side of the lower portion of the vessel, each support member extending between a portion of the vessel and the floor to support the vessel in the container and prevent rolling movement of the vessel in the container.

7. The apparatus of claim 6 wherein there are a plurality of pairs of support members spaced along the length of the vessel.

8. The apparatus of claim 6 wherein the support members are bolted to the floor and to their corresponding portions of the vessel to secure the vessel in the container.

9. The apparatus of claim 5 further comprising at least one connector extending from an upper portion of the vessel and at least one connector extending from the container, the connectors being connected together to secure the vessel in the container.

10. The apparatus of claim 9 wherein there are a plurality of connectors extending from the upper portions of the vessel and the container and along the lengths thereof.

11. The apparatus of claim 5 further comprising at least one tension ring extending around the vessel and wherein each support member is in the form of an angle member secured to the tension ring and bolted to the floor of the container.

12. The apparatus of claim 11 wherein there are a plurality of tension rings spaced along the axis of the vessel, and a plurality of pairs of support members connected to the tension rings.

13. The apparatus of claim 5 wherein the vessel is insertable into the container through one end of the container.

14. The apparatus of claim 5 wherein a dead-air space is defined between the lower outer surface of the vessel and the floor of the container to insulate the vessel.

15. The apparatus of claim 14 further comprising an insulation material disposed in the dead-air space.

16. The apparatus of claim 1 further comprising at least one vent extending through the vessel for facilitating the discharge of the materials through the discharge assembly.

17. The apparatus of claim 1 further comprising a fill pipe extending through the inlet opening for introducing the materials into the vessel.

18. The apparatus of claim 1 further comprising means for positioning and supporting the apparatus within a shipping container.

* * * * *